Sept. 26, 1939.  T. W. GREENE  2,174,218
UNITING METAL MEMBERS
Filed Nov. 24, 1936  2 Sheets-Sheet 1

INVENTOR
THOMAS W. GREENE
BY
ATTORNEY

Sept. 26, 1939. T. W. GREENE 2,174,218
UNITING METAL MEMBERS
Filed Nov. 24, 1936 2 Sheets-Sheet 2

INVENTOR
THOMAS W. GREENE
BY
ATTORNEY

Patented Sept. 26, 1939

2,174,218

UNITED STATES PATENT OFFICE 2,174,218

UNITING METAL MEMBERS

Thomas W. Greene, New York, N. Y., assignor to The Linde Air Products Company, a corporation of Ohio Application November 24, 1936, Serial No. 112,501

4 Claims. (Cl. 29—157)

This invention relates to a method of uniting metal members and the articles utilized therein. More specifically, this invention relates to a method of uniting tubular members such as metal conduits and fittings, and to the conduits and fittings utilized therein.

It is uneconomical to utilize flanged joints in the construction of pipe lines of small size, and butt welding of pipe joints requires special skill and involves practical difficulties in its application to smaller pipe sizes. A threaded joint is uneconomical in that it necessitates the use of heavier pipe, since the amount of material cut away to produce the thread considerably weakens the pipe structure at the joint, and the strength of the threaded joint is considerably less than that of the pipe itself. In addition, in assembling a considerable number of pipes and fittings, such as in heating and water systems, it is common practice to cut and thread the pipes as they are placed in position, thus necessitating the tightening of the threaded joint, the measuring of the pipe, the loosening of the joint, the cutting and threading of the other end of the pipe, and the final tightening of the joint. Repeated tightening and loosening of a threaded joint tends to weaken the structure of the pipe at the joint and destroy the effectiveness of the thread.

Therefore, the objects of this invention are: To provide a method of uniting metal members which will be simple and easy to perform and which does not require the services of a skilled operator; to provide a method of forming pipe joints which will obviate the necessity for threaded joints; to provide a method of uniting fittings and conduits which permits assembly and disassembly prior to final jointure with a minimum of effort and avoids the possibility of weakening the joint; and to provide metal members, particularly pipe fittings and conduits, which will be simple and easy to manufacture and which will be particularly adapted to be utilized in this invention.

These and other objects and advantages of this invention will become apparent from the following description and the accompanying drawings, in which:

Fig. 1 is a longitudinal sectional view illustrating a method of forming joints according to this invention;

Figs. 2, 3, and 4 are vertical views of resilient metallic rings adapted to be utilized in this invention;

Figure 1:
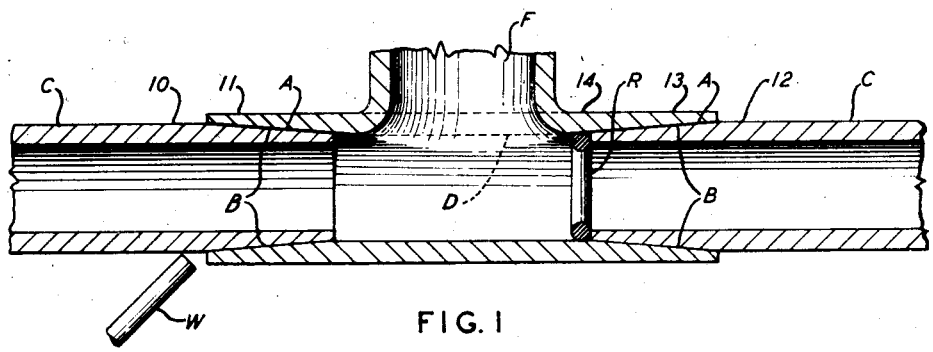

As disclosed in Fig. 1, a fitting F and conduits C are adapted to be united in accordance with this invention. The fitting F may be a T, as shown, or may be any other type of fitting, such as a cross, elbow, or Y. It may also be a collar or sleeve, as is indicated by dotted lines D. The conduits C may be pipes, as shown, or solid rods having a circular cross-section, or may have other cross-sectional shape, such as rectangular, oval, polygonal, or otherwise, and the end or ends of the fitting may also have any shape conforming to the parts to which they are to be united. The inner surfaces of the fitting F are gradually tapered adjacent the ends thereof so as to provide tapered surfaces A, and the outer surfaces of the conduits C are gradually tapered adjacent the ends thereof so as to provide tapered surfaces B. The surfaces are preferably formed so as to have the same taper, as is illustrated. The tapered end of either conduit C is adapted to be inserted telescopically in either inner tapered end of the fitting F in order to provide a close contact between the mating surfaces A and B, and is preferably inserted with sufficient force to effect a frictional engagement of the surfaces. A frictional engagement will provide a mechanical union of the conduits and fitting which will hold them in position during subsequent measuring and other operations.

After assembly, the surfaces are heated and molten brazing metal having a melting point lower than that of the fitting and conduits is permitted to be drawn between the surfaces by capillary action, where, upon subsequent cooling, it will solidify and unite the conduit and fitting to complete the joint. The conduits may be externally supported, particularly in cases in which a conduit is suspended vertically from a fitting, so that expansion and contraction which may occur during heating will not affect the close contact of the tapered surfaces.

The brazing metal may be applied from the outside of the joint in any suitable form, such as a metal welding rod W, or from the inside in the form of a resilient insert, such as a metal split ring R. To insure a strong, firm joint the tapered surfaces are preferably cleaned and a suitable flux applied thereto prior to assembly and the surfaces are preferably heated to a temperature above the "wetting" or tinning temperature of the brazing metal. The tinning temperature of the brazing metal will, of course, depend upon its composition and that of the conduits and fitting, but will usually be slightly lower than its melting point. With the surfaces at a temperature at or above the "wetting" temperature, they will be thoroughly tinned and the melted brazing metal will seek its way between them, no matter how small the clearance. In general, the smaller the clearance, the stronger the joint will be which is produced. The tapered end of the conduit may be inserted in the tapered end of the fitting with sufficient force to effect such a close contact of the surfaces A and B that a feeler-gauge having a thickness of one one-thousandth of an inch cannot be inserted between them, and a very strong joint easily and successfully produced. The best results are produced when the clearance between the surfaces A and B is microscopic or less than 0.005 inch.

In the case the brazing metal is to be applied from the outside, as in the utilization of the welding rod W, a source of high temperature heat, such as an oxy-fuel gas flame (not shown) may be applied to that portion of the outer surface of the conduit C adjacent the end of the fitting, as at 10, and completely around the periphery of the conduit so that the surface B will by conduction be raised to a temperature above the tinning point of the brazing metal. Subsequent to, or concurrently with, the heating of the conduit, heat may be applied to the outer surface of the fitting, as at 11, and completely around the periphery thereof, so that the surface A will also by conduction be raised to a temperature above the tinning point of the brazing metal. It will be understood that the temperature of the surface A will also be raised by heat conducted from the surface B, and vice versa, since the surfaces are in contact, and preferably in frictional engagement. When the ends of the conduit and fitting and the surfaces have been raised to the proper temperature, the brazing metal may be melted by the heating means and applied to the surface of the conduit, but it may be preferable to heat the portion 10 of the surface of the conduit to a temperature above the melting point of the brazing metal and apply the same directly to the surface of the conduit, utilizing the heat contained in the conduit to melt the brazing metal. Such heating of the conduit surface and application of the brazing metal also provides a simple method of determining whether the conduit and surfaces have reached a sufficiently high temperature.

As the brazing metal melts, it will adhere to and tin the heated surface of the conduit adjacent the end of the fitting and, by capillary action, will be drawn between the surfaces A and B. As the temperature of the surfaces A and B is above the tinning point of the brazing metal, the melted metal will tin and adhere to both surfaces.

While it has been found sufficient to apply the rod of brazing metal to several points around the periphery of the conduit close to the joint, it is preferred to "wipe" the rod around the periphery adjacent the joint to insure an adequate supply of molten metal to the entire area of the surface.

Figure 2:
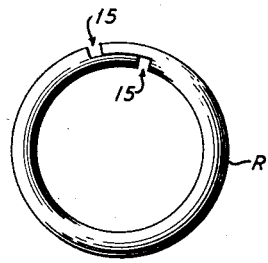
Figure 6:
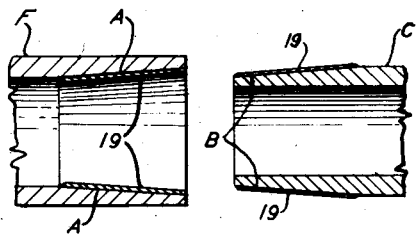
Fig. 6 is a partial longitudinal sectional view illustrating portions of a fitting and a conduit manufactured according to this invention and adapted to be shipped to a user.
Figure 3:
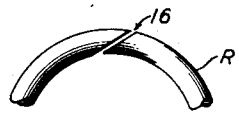
Figure 5:
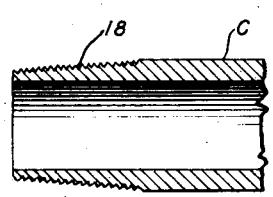
Fig. 5 is a vertical sectional view illustrating an alternative method of shaping the ends of a pipe.
Figure 4:
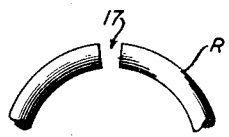

In case the brazing metal is to be applied from the inside, as in the utilization of the fusible metal insert or ring R, the ring is inserted in the fitting before the tapered end of the conduit is placed therein. The ring is preferably a one piece resilient member which has a normal outer diameter equal to or greater than that of the surface A closely adjacent the end of the fitting. Various forms which the ring may have are shown in Figs. 4 to 6 in which the ring is provided with spaces 15, 16 and 17 which are adapted to be closed as the ring is pushed into the smaller portion of the tapered surface. In Figs. 2 and 3 the ring is provided with overlapping ends, and in Fig. 4 the ring is provided with abutting ends which normally form a space between them. It is to be understood that any form of insert or ring may be used as long as the insert conforms in shape to the surface A, and an insert of any cross-sectional form, circular or otherwise, may be utilized.

After the cleaning and fluxing of the surfaces A and B, the insertion of the ring R, and the insertion of the tapered end of the conduit C into the tapered inner end of the fitting F, preferably with sufficient force to effect a frictional engagement of the surfaces, the fitting, conduit and ring will be in the position shown in Fig. 1. The high temperature source of heat may then be applied to the conduit C and the fitting F in a manner similar to that disclosed in the preceding method of heating. However, in order to insure that all portions of the surfaces will be raised to the required temperature, heat is preferably applied first to the conduit at a point adjacent the outer edge of the fitting, as at 12, then to the outer surface of the fitting adjacent the end, as at 13, and lastly adjacent the ring, as at 14, heating the entire periphery of the fitting and conduit at each point. The heat conducted from the surfaces A and B and the heat conducted through the fitting from the outer surface 14 adjacent the ring R is utilized to melt the ring. The greater application of heat to the conduit will insure, prior to the melting, the elevation of the temperature of the surfaces to a point above that of the tinning temperature and perhaps even above the melting point of the brazing metal itself. Upon the melting of the brazing metal, capillary action will draw the melted brazing metal between the surfaces exactly as in the application of brazing metal from the outside. When the melted brazing metal has been drawn completely between the surfaces, it will appear at the outer edge of the fitting and thus will give an indication of the completion of the heating and melting operation.

When the brazing metal has been drawn between the surfaces A and B from either the outside or inside, the fitting and conduit are permitted to cool so that the brazing metal will solidify and unite the fitting and conduit with a strong and efficient bond, since the tinning of the surfaces insures the complete adherence of the brazing metal to them.

The tapered end of the conduit may be provided with a plurality of small fine threads 18, as in Fig. 5, and the conduit twisted as the tapered end is inserted in the fitting, so that the threads will engage the inner tapered surface of the fitting. This will provide a strong mechanical union before the introduction of the melted brazing metal, but the conduit may be removed and replaced several times prior to the introduction of the brazing metal without weakening the joint finally formed, as the engagement of the threads with the inner tapered surface of the fitting is not depended upon to produce the joint. Such fine threads may be found desirable and useful in suspending a long vertical length of pipe from a fitting. Either of the previous methods of heating and application of brazing metal may be utilized in the use of the fine-threaded taper.

The tapering of the ends of the fitting and conduit may be performed at a point removed from the final point of installation and, as it is advantageous to protect the surfaces A and B from the effects of corrosion or of dirt, grease or other material which may accumulate thereon during hauling or shipping, an easily removable protective coating 19, as in Fig. 6, may be applied to the surfaces by the manufacturer prior to shipment to a user. The protective coating 19 may comprise paint, vinylite paint, varnish or lacquer, copper sulphate, paraffin, or other suitable chemical material. In addition, copper or other nonferrous metal may be applied to the surfaces by means of plating, dip brazing, or spraying. These materials are easily removed at the point of use, and will permit the shipment or the storage for an extended period of time of conduits and fittings prepared in this manner without fear of corrosion or the adherence of deleterious material to the tapered surfaces.

The surfaces A and B may be tapered at any angle, as the taper provides an accurate fit advantageous to successful capillary brazing. However, in the application of this invention to the assembly of water or heating pipe-lines and the utilization of ordinary fittings and commercial pipe, a taper of $\frac{3}{32}$ inch of radius per inch of length, the ordinary pipe thread taper, is particularly advantageous for reasons to be pointed out hereinafter.

Figure 8:
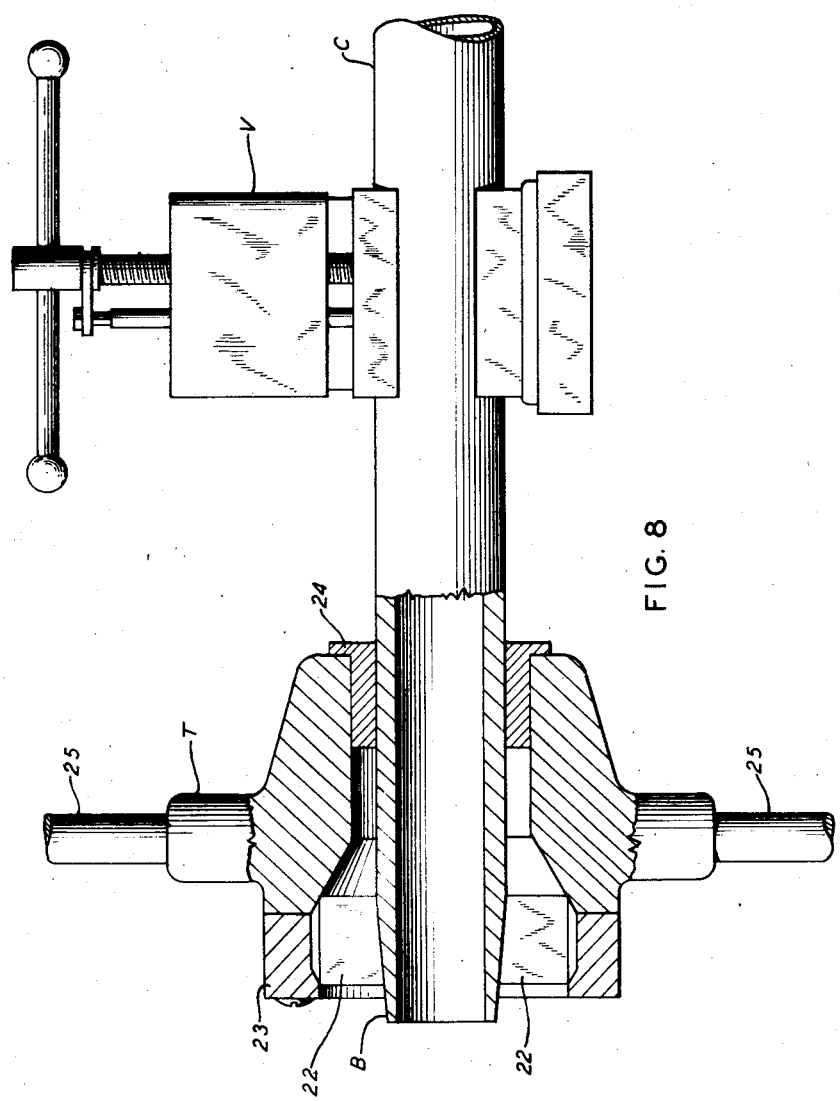
Fig. 8 is a vertical view, partially in section, of apparatus adapted to be utilized in the shaping of the end of a pipe in accordance with this invention.

An application of this invention to ordinary commercial iron or steel pipe is illustrated in Fig. 8, in which the pipe C is held in a vise V, and a threading tool is equipped with machining dies 22, substituted for the usual threading dies, and held in position by a collar 23. The threading tool T is provided with a bushing 24, which is adapted to guide the machining dies, and handles 25, which are adapted to be turned in a manner similar to that employed in the ordinary pipe threading operation, so that the machining dies 22 will taper the outer surface of the pipe adjacent the end thereof and produce the tapered surface B. The application of this invention to ordinary commercial pipe is an important feature, since the employment of machining dies in place of the threading dies in standard pipe threading tools renders such application inexpensive and quite economical.

Figure 7:
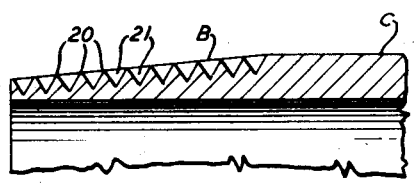
Fig. 7 is a longitudinal sectional view of a portion of pipe adjacent the end thereof.

One advantage of this invention, particularly as applied to ordinary commercial fittings and pipes of smaller diameter, lies in the additional strength that is produced in the joint. As illustrated in Fig. 7, in which the conduit C is provided with standard pipe threads 20, the difference in the amount of material forming the wall of the pipe is indicated by the spaces 21 lying between the pipe threads 20 and the surface B. This added material increases the strength of the joint produced and also decreases the amount of work necessary to prepare the end of the pipe.

As an example of the strength developed by a joint prepared in accordance with this invention, a one inch commercial steel pipe was united to a standard one inch malleable iron fitting. A water-soluble flux consisting essentially of borax, and brazing metal comprising a welding rod composed of material such as is disclosed in U. S. Patent Reissue No. 17,631, were utilized. The joint so produced withstood a pulling load of 30,250 pounds before the pipe itself broke, whereas an ordinary one inch screw-threaded fitting required a pulling load of only 17,800 pounds to pull the pipe threads out of the fitting.

Another advantage of this invention lies in its applicability to lap or butt-welded steel or wrought iron pipe, since two specimens of this type of pipe may vary as much as 0.040 inch in actual diameter. This variation in diameter or transverse outer dimension does not affect the close, accurate fit which the taper permits. In addition, more economical fittings, such as cast or malleable iron fittings, may be used in the application of this invention, since highly accurate manufactured dimensions are not essential to the success of the joint made, as the taper provides the only close fit necessary.

Still another advantage of this invention lies in the ease and efficiency with which a plurality of conduits and fittings may be united in a pipe line, such as in a heating or water system. The tapered joints permit the removal of any piece of pipe during the assembly of the line for the purpose of measuring, cutting, etc., and the line may be entirely assembled with an accurate alignment of all its parts and the capillary brazing operation performed on all the joints at substantially the same time. Or, one or more workmen may set about assembling the line, followed by subsequent workmen performing the final heating and brazing operation.

It is to be understood that this invention may be applied not only to fittings and conduits of any shape, but also to those composed of any metallic material which may be brazed, soldered, or welded, and the fitting and conduit may be composed of different materials. The brazing material may be any metallic composition which has a lower melting point than the fitting or conduit and is adapted to fuse and adhere to the tapered surfaces thereof. Other changes may be made without departing from the spirit of this invention.

What is claimed is:

1. Process of uniting metal cylindrical pipe members involving the mating of gradually-tapered end portions thereof which are heated sufficiently to cause bonding metal having a lower melting point than that of such pipe members to be drawn by capillary action between said mating tapered ends, which process comprises the steps of machine cutting both of such tapered ends so that the resulting machine cut smooth metal surfaces mate telescopically without any other obstruction and with a substantial coefficient of friction uniformly throughout their area of contact, which not only acts to hold the metal pipe members together prior to the heating operation but also provides a uniformly critical microscopic clearance throughout the area of contact of such mating surfaces so that melted bonding metal is drawn by capillary action into said critical microscopic clearance throughout said area of contact and results in a sound metal bond uniting said tapered end portions of said metal pipe members, telescoping said members, heating the assembled members and applying bonding metal in such a position that it will be drawn between said members by capillary action.

2. Method of uniting a metal pipe and fitting of a commercially available type wherein the pipe is adapted to have an end portion threaded to screw into the threaded end portion of a fitting; said method comprising the steps of machine cutting a gradual taper internally on an end portion of the fitting instead of threading the same; machine cutting a gradual taper externally on an end portion of the pipe; said tapers exposing smooth and clean metallic surfaces adapted to mate in concentric relation when longitudinally telescoped together; inserting the tapered end portion of said pipe into the tapered end portion of said fitting without any other obstruction so that said surfaces are in uniform metal-to-metal contact which not only acts to hold the pipe and fitting temporarily together but also provides a proper critical clearance for capillary brazing; heating said surfaces; supplying brazing metal to said heated surfaces so that molten brazing metal is uniformly distributed by capillary action throughout the area of contact between said surfaces; and causing the molten brazing metal so distributed to cool and solidify to unite said fitting and said pipe.

3. Method as defined by claim 2 wherein solid brazing metal in the form of a split resilient ring is forced into the tapered end portion of the fitting ahead of the inner end of the tapered end portion of the pipe, so that when the end portions are heated such solid brazing metal is melted and drawn by capillary action between said contacting surfaces.

4. A pipe joint comprising a cylindrical metal pipe member having a gradually tapered outer machine-cut smooth surface at and adjacent the end thereof; a second cylindrical metal pipe member or fitting having a gradually and correspondingly tapered inner machine-cut smooth surface at and adjacent the end thereof; and bonding metal having a capillary thickness disposed between and uniting said gradually tapered surfaces, said bonding metal being distributed uniformly throughout substantially the entire opposing areas of said tapered surfaces and the taper of said surfaces being the same and sufficiently gradual and also having sufficient length longitudinally of the axes of said members so that said metal members will mate telescopically without any other obstruction and be held together with a substantial coefficient of friction while said surfaces are being heated and melted bonding metal is being drawn by capillary action throughout the area of contact between said surfaces, the taper of said surfaces also being sufficiently gradual so that the length of tapered surface and corresponding length of said areas united by said bonding metal is sufficiently great to render the strength of said joint greater in tension than the strength in tension of a threaded joint uniting pipe members of the same size.

THOMAS W. GREENE.